O. CHRISTIANSON.
ADJUSTABLE PULVERIZER.
APPLICATION FILED JUNE 15, 1911.

1,017,383.

Patented Feb. 13, 1912.

2 SHEETS—SHEET 1.

WITNESSES:

INVENTOR
Oscar Christianson
BY
ATTORNEY

O. CHRISTIANSON.
ADJUSTABLE PULVERIZER.
APPLICATION FILED JUNE 15, 1911.
1,017,383.
Patented Feb. 13, 1912.
2 SHEETS—SHEET 2.
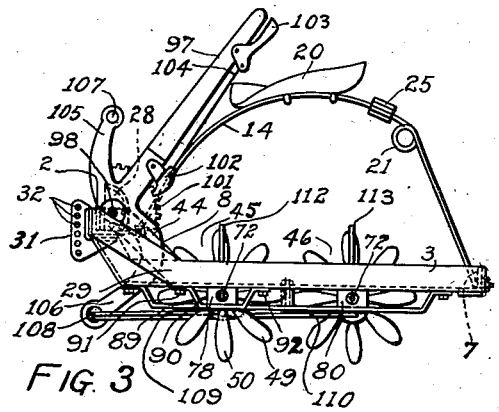
FIG. 3
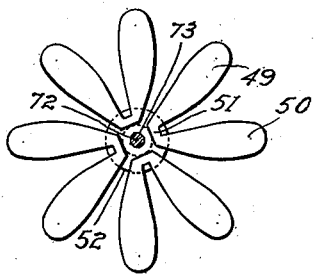
FIG. 5
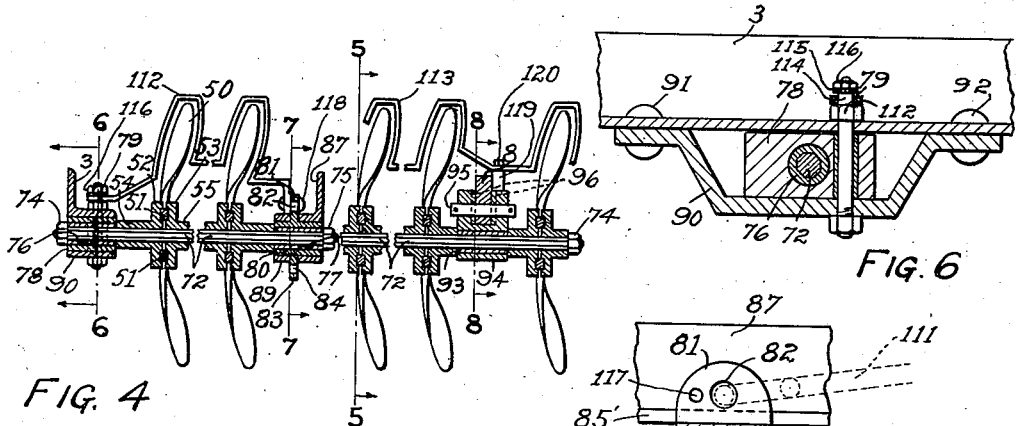
FIG. 4
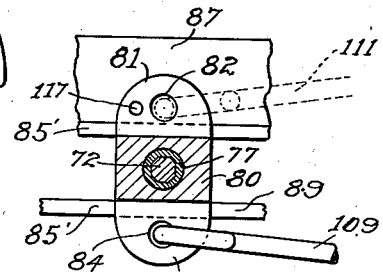
FIG. 6
FIG. 7
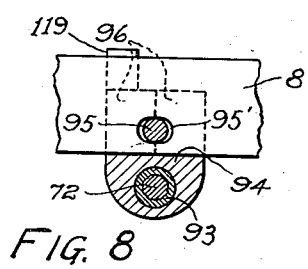
FIG. 8
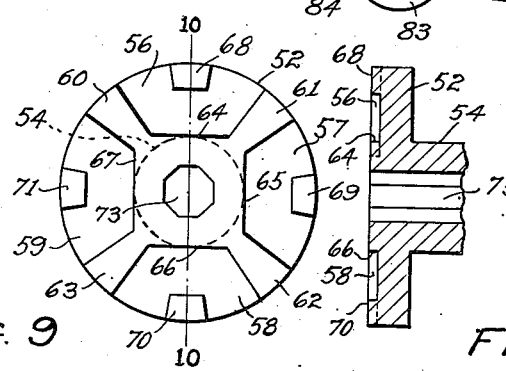
FIG. 9
FIG. 10
WITNESSES:
Wm. G. Blomstrom.
M. L. Allen.
INVENTOR
Oscar Christianson
BY James Beckstrom
ATTORNEY

UNITED STATES PATENT OFFICE.

OSCAR CHRISTIANSON, OF SUGAR GROVE, ILLINOIS.

ADJUSTABLE PULVERIZER.

1,017,383.  Specification of Letters Patent.  Patented Feb. 13, 1912.

Application filed June 15, 1911. Serial No. 633,399.

*To all whom it may concern:*

Be it known that I, OSCAR CHRISTIANSON, a citizen of the United States, residing at Sugar Grove, in the county of Kane and State of Illinois, have invented certain new and useful Improvements in Adjustable Pulverizers, of which the following is a specification.

My invention relates to pulverizing machines, and the objects of the invention are to provide a machine capable of not only pulverizing the soil, but also evening out ridges, forming ridges, or "hilling up" the ground; to provide for more universal adaptation to the various uses to which implements of this class have heretofore been put, or to combine in one machine the operations of several types of machines; to provide a construction wherein the gangs of disks, blades or cutters may be conveniently shifted or adjusted during the operation of the machine, and to provide a simple and rigid form of construction entailing a minimum of expense for the variety of work it is adapted to accomplish.

Another object of the invention is to provide convenient and simple means for shifting or reversing or arranging the "disk" or concavity of disks or blades relative to each other in each individual gang of disks and of the disks of one gang of disks relative to the disks of other gangs in the same implement.

The invention further contemplates improvements in the adjustments of the draft to enable the implement to work evenly and thoroughly.

Other minor objects and advantages to be derived from the present improvement will appear from the subjoined detail description, and with the foregoing in view the invention consists in the novel construction, combination and arrangement of parts hereinafter described in detail, illustrated in the accompanying drawings and particularly pointed out in the appended claims.

Figure 1:
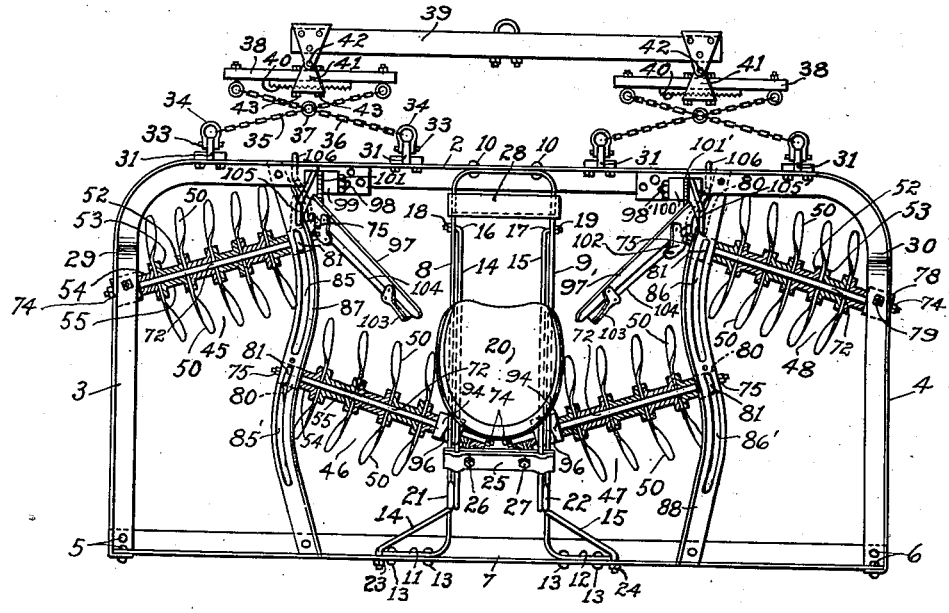
Figure 2:
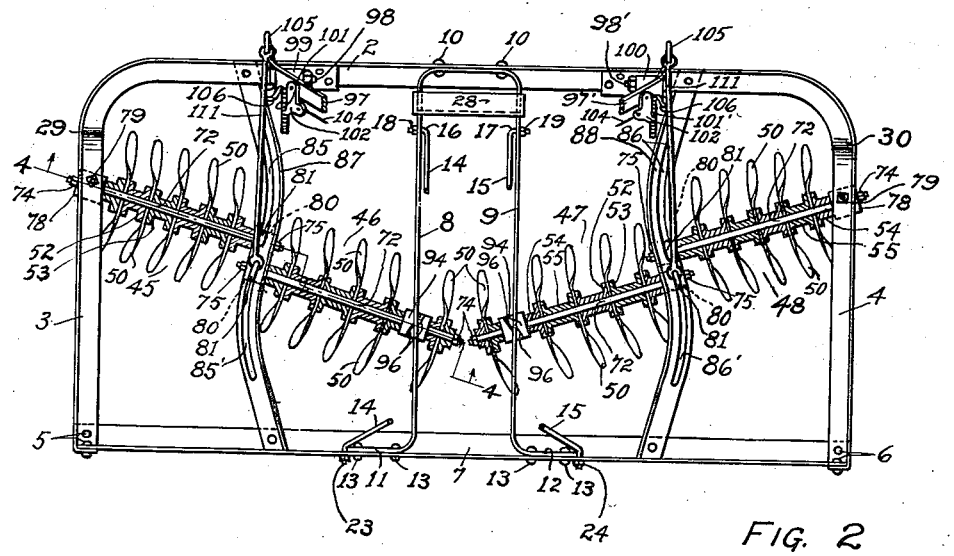

In the drawings—Figure 1 is a plan view of a farm implement or machine embodying my invention, showing the gangs of pulverizer sets in one series of adjustments. Fig. 2 is a view similar to Fig. 1, showing different adjustments, with the driver's seat and draft rigging broken away to more clearly show certain details. Fig. 3 is a left end elevation of the machine, the shafts and gangs of pulverizer-blades being arranged parallel with each other instead of at angles as in Figs. 1 and 2, to more clearly show the parts illustrated in said Fig. 3. Fig. 4 is a section taken substantially on line 4—4 of Fig. 2, partly broken away. Fig. 5 is a vertical section taken substantially on line 5—5 of Fig. 4. Fig. 6 is a vertical section taken substantially on line 6—6 of Fig. 4. Fig. 7 is a vertical section taken substantially on line 7—7 of Fig. 4. Fig. 8 is a vertical section taken substantially on line 8—8 of Fig. 4. Fig. 9 is an enlarged inner face view of one of the sections of a blade-holding hub for each set of blades or disks composing a gang of sets. Fig. 10 is a section taken on line 10—10 of Fig. 9.

Referring in detail to the several views, the frame of the machine or implement shown as the present embodiment of my invention, consists of a pair of angle-irons, one thereof forming the front and sides or ends by being bent twice to form the ends 3 and 4 the intermediate portion constituting a front portion 2 of the frame. To the extremities of the end portions of the frame are riveted at 5 and 6 the ends of a straight angle iron 7 which constitutes the rear portion of the frame. Spanning the intermediate portion of the frame from its front to its rear are a pair of metal bars 8 and 9 which serve as supports for two of the four gangs of pulverizer blades or disks employed in my invention as shown in Figs. 1 and 2. The bars 8 and 9 are preferably formed of a single bar of metal bent upon itself to form the two bars 8 and 9. At the return bend this single bar is secured in any suitable manner to the forward portion 2, as by rivets 10, 10 to the vertical flange of the angle iron of which the front and sides or ends of the frame is made. The form of the bar 8—9 in cross section is shown at 8 in Fig. 4. These bars stand on edge, are caused to rest on the horizontal flanges of the frame angle-iron or irons, and at the rear frame-portion 7 they are likewise secured to the vertical flange by being bent at 11 and 12 parallel with and against the vertical flange of the part 7 to which said bent portions are secured by means of rivets 13 in the same manner as at 10, 10 at the front of the frame.

The driver's seat is supported by the bars 8 and 9 through a pair of spring-rods 14 and 15 which are curved to form arched springs for an ordinary sulky-seat 20. At the front the ends of these spring-rods are bent laterally to form lugs 16 and 17. These lugs pass through suitable perforations in the bars 8 and 9, are threaded and provided with nuts 18 and 19 which secure the lugs to the bars 8 and 9 as shown in Figs. 1 and 2. From the said lugs the spring-rods curve upwardly to the seat 20 which may be mounted adjustably in any suitable manner at the top of the curve as indicated in Fig. 3. Immediately in the rear of the seat the rods are formed into loops 21 and 22 which add to the resiliency of the seat's spring-support. At the rear portion of the frame the spring-rods are fastened to the iron 7 in the same manner as at the front by being formed with threaded lugs 23 and 24 which are fastened to the vertical flange of the iron 7. In order to steady these spring-supports laterally I spread the rods at the rear or bend them laterally away from each other as shown in Figs. 1 and 2 to widen the base of the support at the rear. In the rear of the seat 20 the spring-rods are yoked together by means of a cross-bar 25 which is in the form of a clamp consisting of a pair of members bolted together as at 26 and 27 against opposite sides of said rods. Immediately in front of the forward fastenings for the spring-rods I mount a foot-rest 28 on the bars 8 and 9.

As shown in Fig. 3 the angle iron 2, 3 and 4 in addition to being bent in a horizontal plane to form the end or side portions referred to, has the latter bent upwardly at 29 and 30 for the purpose of elevating the front portion 2, the draft-attachment and the foot-rest above the horizontal plane of the balance of the frame and the bearings for the disks, disks, pulverizer-blades, cutters, or diggers.

To the front of the frame are bolted, or otherwise suitably fastened, a series of clevises 31 each provided with the usual vertical row of holes 32 for the proper adjustment of the clevis link pins 33 holding the link or loop 34. As shown in Fig. 1 two pairs of these clevises are provided, each pair being connected with a cross-tree 38 by means of chains 35 and 36 which cross each other from the links 34 to the tree 38 in a ring 37. The trees 38 are connected by an equalizer bar 39 which is adjustable longitudinally with respect to the trees 38 by means of a toothed or serrated rack 40 engaged by a coupler-clamp 41 pivoted at 42 to a suitable bracket on the equalizer bar ends.

43 represents bolts by means of which the members 41 are clamped against the serrations on the rack 40.

Within the frame composed of the sides 2, 3, 4 and 7 are mounted four gangs of pulverizer blades or disks, each gang being shown in the present instance as consisting of five sets of blades, bits, cutters or diggers, a side view of one of which sets is shown in Fig. 5. These sets are formed of double blades 49 and 50, or in one piece of metal, with a base-yoke or cross-piece at the butt-ends of the blades 49 and 50. This base or butt-end portion 51 is clamped between hub-disks 52 and 53 having hubs 54 and 55, as shown in Fig. 4. These hubs and disks are arranged in pairs the members of which are substantially identical and have recessed adjacent faces such as the formation seen in the Figs. 9 and 10. In each of these disks is a series of recesses 56, 57, 58 and 59 each of a depth to receive substantially one-half the thickness of the hub-portion 51 of the blades, the remaining half of the thickness being lodged in the corresponding recess of the companion member of the hub-set. The formation of the recesses leaves radial ribs 60, 61, 62 and 63 which lend lateral support to the blades 49 and 50, four such pairs being provided for as indicated in Fig. 5. Inner recess walls 64, 65, 66 and 67 support the blades against longitudinal movement inwardly and against outward movement the base portion 51 of the blades is supported by lugs 68, 69, 70, and 71. The entire series of sets of eight blades or four double blades forming each of the gangs of pulverizers, labeled 45, 46, 47 and 48, is, as shown in Fig. 4 clamped together upon a shaft 72 for which octagon openings 73 are formed through the hubs and disks, the shaft being the same in cross-section. Nuts 74 and 75 on the ends of the shaft bind the whole series of five sets together on the shaft. Between each of said nuts and the outermost hub at each end is interposed a sleeve or bushing labeled 76 at one end and 77 at the opposite end. These bushings serve as bearing surfaces for the shaft. The bushing 76 is journaled in a bearing-box 78 which is pivotally mounted on the end 3 or 4 of the frame with the aid of a pivot-bolt 79 which passes through the bearing-box laterally of the shaft-bearing, and through the horizontal flange of the angle iron of the frame. The bushing 77 at the opposite end of the shaft, is mounted in a bearing-box 80 having an upwardly projecting ear 81 having a hole or eye 82 therethrough, and a downwardly projecting ear 83 having an eye or hole 84 therethrough. To these ears are attached, as will more fully appear hereinafter, the inner ends of rods which connect the shafts with the operating lever mechanism by means of which the gangs of pulverizer blades are brought into or out of parallelism with the sides 2 and 7 of the frame. The ears 81 and 83 are provided for one end of each of the shafts 72, being the bearing at that end of the shaft which is moved angularly by the operating-lever. The bearing for the opposite end of each of the outer or forward shafts is the pivoted bearing 78 and this is mounted on, respectively, the ends 3 and 4 and the bars 8 and 9.

For the swinging ends of the shafts or gangs angle-iron supports are provided, these supports being double-curved to conform with the curvature of the arc of swing of the gangs. These curved angle-irons are labeled 87 and 88 in Figs. 1, 2 and 4. Each of these curved angle irons is provided with a forward slot, which is labeled 85 at the left side and 86 at the right side in Figs. 1 and 2. These slots conform to the curvature of the arc of swing of the gang 45 at the left and the gang 48 at the right. Similar rear slots 85' and 86' are provided for the rear gangs 46 and 47. In each instance the slot is engaged by the ear 81 extending upwardly from the bearing 80. The latter is supported on a flat bar of metal 89 (Figs. 3, 4 and 7) which in each instance is curved in conformity with the double curved and slotted angle iron engaged by the ear 81. The lower iron 89 is likewise provided with curved slots identical with the slots 85, 85', 86 and 86', and the slots in said iron 89 are engaged by the lower ears 83 of each of the swinging bearings. The slots for the upper ear 81 and lower ear 83 are indicated at 85' on each of the members 87 and 89 in Fig. 7 where an enlarged section of the upper and lower slide-bearing members for the boxes 80 is shown. Each of the boxes 78, pivoted to the ends 3 and 4, is supported vertically for their horizontal pivotal movement by a bracket 90 shown on an enlarged scale in Fig. 6. This bracket is a strap of metal bent four times at an angle to form a space between the angle iron portion 3 and the bearing part of the bracket as well as fastening ears which are riveted to the horizontal flange of said angle-iron at 91 and 92. As stated, the inner gangs of pulverizer sets 46 and 47 are mounted pivotally on the bars 8 and 9, and the pivotal arrangement for these inner bearings is shown to the right in Fig. 4. Here, too, the shaft is provided with a bearing bushing having a circular periphery and an octagon opening for the shaft. In this instance the bushing, 93, is interposed between the hubs of the two sets of blades next to the inner or pivoted end of the gang. This bushing is mounted in a bearing-box 94 which has a bifurcated upper portion, or a slot 96 adapted to receive the supporting-bar for the pivoted end of the gang 46 or the bar 9 for the corresponding end of the gang 47. Each of these slots has its sides beveled divergently from its middle portion, as shown best in Fig. 2, to permit the necessary angular movement of the bearing-block or box 94. The box 94 is suspended on a horizontal pivot 95 (Figs. 4 and 8) for which an oblong hole 95' is formed through the jaws or bifurcated portion of said box, or, as shown in Fig. 8, through the bar 8 in the one case and the bar 9 in the other, to permit the pivot pin to swing with the block.

As shown in Figs. 1, 2 and 4 the blades or bits are of concave formation, or curved, and the hub-construction and method of assembling the hubs and blades of each gang on its shaft makes provision for convenient reversal of direction of curvature or concavity to dish or concave the blades either inwardly or outwardly as to each gang, or to alternate the curvatures in the individual gang should this be found advantageous in some instances. In Fig. 1 the blades of the sets of gangs 45 and 48 are dished or curved inwardly while the blades of the intermediate gangs 46 and 47 are curved outwardly. This arrangement is designed to at once pulverize the earth and to move it laterally either to hill up the ground or form a ridge or to level out ridges. In the latter event each gang of blades would be over a ridge and the depressions to be filled in would be between the respective pairs of gangs at each side of the middle of the machine. In Fig. 2, on the other hand, the blades are uniformly dished outwardly from the inner ends of the inner gangs, and with this arrangement the machine is adapted to level out a ridge of greater width, or, in case the land is level and it is desired to form elevated beds or ridges, the blades may be uniformly reversed to throw the earth inwardly from both sides of the machine.

The bearing 80 at the swinging end of each gang may be moved either forwardly or rearwardly by a given throw of a lever 97 for the left-hand side and a lever 97' for the right-hand side. The levers 97 and 97' are mounted on studs 98 and 98' on bearing-brackets 99 and 100 secured to the frame side 2. These levers are provided with a usual form of quadrant having notches therein. The quadrants, 101, 101' may be cast integrally with the brackets (99 and 100) and are provided with the usual pawl or detent 102 connected with a finger-lever 103 by a rod 104. On the lower ends of the levers 97 and 97' are formed oppositely extending crank-arms 105 and 106, in the ends of which are formed eyes or openings 107 and 108, respectively, to either or both of which may be connected rods leading to the bearings 80.

In the arrangement shown in Figs. 3 and 7 a rod 109 connects the ear 83 on the slide-bearing 80 of the pulverizer gang 45 with the hole 108 on the arm 106, and the bearing 80 for the gang 48 is similarly connected with the arm 106 of the lever at that side of the machine. In like manner the rod 110 is connected with the bearing 80 for each of the gangs 46 and 47. All of the slide-bearings 80 are thus at each throw of the levers in the same direction moved to place the gangs at angles to each other.

In Fig. 2 the connections for the front gangs 45 and 48 are the same as in Fig. 1, and the rod 109 shown in Fig. 3 may represent the connecting rod. In Fig. 2, however, the rear gangs 46 and 47 are connected through the upper, instead of the lower, ear 81 of each bearing, as well as with the upper holes or arms of the levers in each instance. In Fig. 2 the rod corresponding to the rod 110 in Fig. 3 is, owing to its changed position and directions of movement, labeled 111, and other variations in connections between arms and bearings may be made.

While it is common to merely place gangs of disks or blades at angles to each other for the purpose of pulverizing alone and leaving the ground substantially unaffected so far as its elevations and depressions are concerned, the above-described arrangements and combinations of parts contemplate adaptation for the usual pulverizer work, and in addition thereto and in connection therewith the shifting of the soil, thus performing at one operation and with the same machine several different varieties of soil-workings with a corresponding saving of time, saving in the cost of machinery and its care, as well as saving storage room.

The blade-interlocking hub-sections are designed to hold circular disks as well as the separate blades shown, by providing the disks with the central portions formed as shown to be engaged by the hub-recesses. The division of the work between four gangs of blades or disks and the provision of a lever for each pair of gangs, facilitates very greatly the shifting of the pulverizer blades while they are at work or in the ground and makes it possible to adjust the gangs without first jacking up the ends of the machine.

In Fig. 4 is shown mud-guard attachments 112 and 113. Each of these attachments is in the form of a bar of metal bent around the ends of the blades and having portions projecting between adjacent blade-sets. These inward projections are designed to brush off clods of earth tending to stick to the blades or disks. The ends of these attachments, which may be termed blade scrapers, are provided with eyes or loops adapted to be fastened to stationary parts of the machine. One end of each scraper 112 has its eye or loop at that end mounted on a reduced projecting portion 114 of a bolt 79. A washer 115 is threaded on the said reduced end, the eye of the scraper is then threaded on said reduced end, and this eye is fastened or held against displacement by a nut 116 which has threaded engagement with the outer end of the projecting portion 114. The opposite end of the scraper 112 has its eye or loop fastened by a rivet 118 (Fig. 4) held in a hole 117 (Fig. 7) on the ear 81. The scrapers 113 are fastened in substantially the same manner but with slight modifications owing to the difference in the form of structure to which they must be partly fastened. The left-hand end of the scraper 113 is shown broken away, but the loop at its broken-away end is also fastened by a rivet 118 held in the bore 117. At its opposite end each scraper 113 is fastened as shown in Fig. 4 to the right, namely on an upward projection 119 (Figs. 4 and 8) from the bearing 94, to which projection the scraper is secured by a screw 120.

Having thus described my invention, I claim as new and desire to secure by Letters Patent—

1. In a pulverizer, the combination with the frame of the machine, of a pair of gangs of pulverizer disks or blades pivoted at their opposite ends to the sides of said frame, another pair of gangs pivoted at the median draft line of the frame, a pair of slide-ways on which adjacent ends of the first mentioned pair of gangs and opposite ends of the last mentioned pair of gangs are movable angularly relative to each other, means for supporting a driver on said pulverizer, and means for adjusting all of said gangs from the driver's seat.

2. In a pulverizer, the combination of a frame, a pair of gangs of pulverizer disks or blades, each having one of its ends pivoted to a side of said frame, a second pair of gangs having their adjacent ends pivoted at the middle draft line of the machine, a pair of slide-ways on which the other ends of said gangs are angularly movable, a pair of levers for moving the movable ends of said gangs and connections between said levers and said last mentioned ends whereby the latter are moved at each throw of said levers and means for reversing said connections to reverse the direction of movement of each gang without changing the directions of movements of said levers.

In testimony whereof I have hereunto signed my name in the presence of two subscribing witnesses.

OSCAR CHRISTIANSON.

Witnesses:
 CHAS. TOLF,
 M. C. ALLEN.